US011160060B2

(12) United States Patent
Karjalainen et al.

(10) Patent No.: US 11,160,060 B2
(45) Date of Patent: Oct. 26, 2021

(54) DIFFERENTIAL REPORTING FOR BEAM GROUPS OR ANTENNA PANEL GROUPS

(71) Applicant: Nokia Technologies Oy, Espoo (FI)

(72) Inventors: Juha Pekka Karjalainen, Oulu (FI); Timo Koskela, Oulu (FI); Mihai Enescu, Espoo (FI); Sami-Jukka Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 16/487,809

(22) PCT Filed: Mar. 24, 2017

(86) PCT No.: PCT/IB2017/051722
§ 371 (c)(1),
(2) Date: Aug. 21, 2019

(87) PCT Pub. No.: WO2018/172823
PCT Pub. Date: Sep. 27, 2018

(65) Prior Publication Data
US 2020/0059921 A1    Feb. 20, 2020

(51) Int. Cl.
*H04W 72/04*    (2009.01)
*H04L 5/00*    (2006.01)
*H04B 7/0417*    (2017.01)

(52) U.S. Cl.
CPC ...... *H04W 72/0413* (2013.01); *H04B 7/0417* (2013.01); *H04L 5/0051* (2013.01); *H04W 72/046* (2013.01)

(58) Field of Classification Search
CPC ............ H04W 72/0413; H04W 72/046; H04L 5/0051; H04B 7/0417

USPC .......................................................... 370/329
See application file for complete search history.

(56) References Cited

U.S. PATENT DOCUMENTS

2011/0250848 A1* 10/2011 Bergljung ............. H04L 1/0026
455/67.11
2019/0037428 A1*  1/2019 Strom .................. H04B 7/0632

OTHER PUBLICATIONS

International Search Report and Written Opinion received for corresponding Patent Cooperation Treaty Application No. PCT/IB2017/051722, dated Nov. 24, 2017, 16 pages.
"WF on Group Based Beam Reportingfor NR MIMO", 3GPP TSG RAN WG1 Meeting #88, R1-1703997, Agenda 8.1.2.2.1, ZTE, Feb. 13-17, 2017, 6 pages.
"UE Reporting for Beam Management", 3GPP TSG RAN WG1 Meeting #88, R1-1701800, Agenda : 8.1.2.2.1, ZTE, Feb. 13-17, 2017, 6 pages.

(Continued)

*Primary Examiner* — Gbemileke J Onamuti
(74) *Attorney, Agent, or Firm* — Nokia Technologies Oy

(57) ABSTRACT

A method comprises: configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, selecting a reporting mode from the multiple reporting modes, and sending a report based on the selected reporting mode.

20 Claims, 10 Drawing Sheets

(56) References Cited

OTHER PUBLICATIONS

"Discussion on Downlink Beam Measurement and UE Reporting Procedure", 3GPP TSG RAN WG 1 Meeting #88, R1-1701714, Agenda : 8.1.2.2.1, Huawei, Feb. 13-17, 2017, pp. 1-10.
"Beam Management Procedure and Beam Reporting for NR", 3GPP TSG RAN WG1 Meeting #88, R1-1703388, Agenda : 8.1.2.2.1, Vivo, Feb. 13-17, 2017, 6 pages.

\* cited by examiner

1000
1010: configuring multi-level based TX beam index reporting for a beam group and/or antenna panel group
1020: selecting a reporting mode configuration from multiple reporting modes for the multi-level based differential beam reporting
1030: transmitting a report to gnB 170 based on a reporting mode selected from block 1020
Fig. 10

DIFFERENTIAL REPORTING FOR BEAM GROUPS OR ANTENNA PANEL GROUPS

RELATED APPLICATION

This application was originally filed as PCT Application No. PCT/IB2017/051722 filed Mar. 24, 2017.

TECHNICAL FIELD

The teachings in accordance with example embodiments of this invention relate generally to beam reporting modes and configurations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The specification work of 5G New Radio (NR) in 3rd Generation Partnership Project (3GPP) includes a work item in RAN1. The work item has a target to provide a full system specification, including multi-antenna functionality in above and below 6 GHz. The work item addresses operation in frequency bands above 6 GHz (which is currently being introduced to 3GPP). A particular characteristic of these frequency bands is the fact that transmission of signals needs to happen based on beamforming, due to the pathloss characteristics. The main framework for such transmission is comprised by the beam management which is defined as a set of Layer 1/Layer 2 (L1/L2) procedures to acquire and maintain a set of Tx/Rx Point(s) (TRP(s)) and/or UE beams that can be used for DL and UL transmission/reception, which include at least following aspects: beam determination, measurement, reporting, sweeping.

Certain abbreviations that may be found in the description and/or in the Figures are herewith defined as follows:
AP Antenna Port
BI Beam Indices
CQI Channel Quality Indicator
CSI-RS Channel State Information Reference Signal
DCI Downlink Control Information
DL Downlink
DMRS Demodulation Reference Signal
FFS For further study
gNB, gNodeB Next generation base station
MAC CE Medium Access control element
NR-PDSCH New Radio Physical downlink Control Channel
PDSCH Physical Downlink Shared Channel
PUCCH Physical Resource Block
PUSCH Physical. Uplink Shared Channel
RAN1 Radio Layer 1
RRC Radio resource control
RSRP reference signal received power
RX receiver
RS reference signals
TRP Tx/Rx Point
TX transmitter
US User Equipment
UL Uplink

SUMMARY

The following summary is merely intended to be exemplary. The summary is not intended to limit the scope of the claims.

In accordance with one aspect, an example method comprises: configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, selecting a reporting mode from the multiple reporting modes, and sending a report based on the selected reporting mode.

In accordance with another aspect, an example apparatus comprises: at least one processor; and at least one non-transitory memory including computer program code, the at least one memory and the computer program code configured to, with the at least one processor, cause the apparatus at least to perform: configure multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, select a reporting mode from the multiple reporting modes, and send a report based on the selected reporting mode.

In accordance with another aspect, an example non-transitory computer program product comprising a computer-readable medium bearing computer program code embodied therein for use with a computer, the computer program code comprising code for configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, selecting a reporting mode from the multiple reporting modes; and sending a report based on the selected reporting mode.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 10 shows a method in accordance with example embodiments which may be performed by an apparatus.

DETAILED DESCRIPTION

In the example embodiments as described herein a novel method and apparatus is proposed to implement design of diverse multi-level beam reporting schemes comprising of beam reporting modes and configurations. A particular attribute of the proposal is that multi-level beam reporting schemes can reduce the feedback signalling overhead for different beam/antenna panel group configurations.

Figure 1:
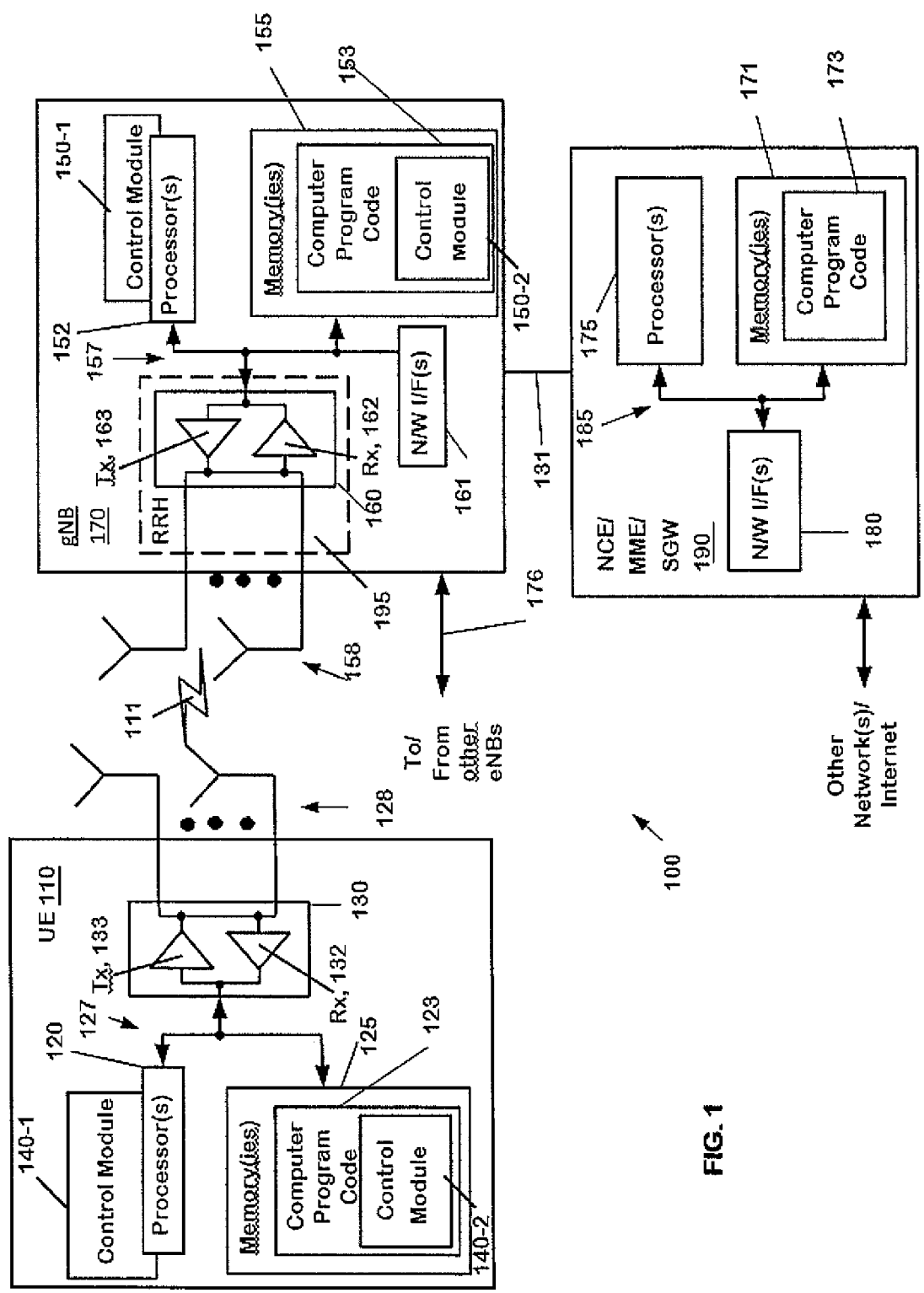
FIG. 1 is a block diagram of an example possible and non-limiting system in which example embodiments may be practiced.

Turning to FIG. 1, this figure shows a block diagram of one possible and non-limiting example system in which example embodiment may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB/gNB 170 via a wireless link 111.

The base station 170 (for example, gNB for NR, new radio, or alternatively, an eNB for LTE long term evolution) provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, for example, link 176. The link 176 may be wired or wireless or both and may implement, for example, an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of example embodiments of this invention, the example embodiments will now be described with greater specificity.

Beam grouping for TRP(s) or UE may be implemented as an operation to group multiple Tx and/or Rx beam(s) and/or beam pair(s) into one subset of beams. The basic and initial measurements on beams in are the form of RSRP. In instances in which there are multiple (for example a multitude of) beams to be measured, the systems and methods herein may implement reporting of RSRP.

In UE based beam grouping schemes, the UE 110 may form beam groups and feedback this information to gNB 170. A beam group may be seen as a collection of downlink TX beams indices associated with a set of RX beams, where the number of different RX beam groups is configurable by a network. In each beam group, there may be N-best downlink TX logical beam indices (BIs) according to a selected criterion. UE based beam grouping schemes may allow the implementation of RX/TX beams in a transparent manner for a network based on the definition of the beam group. Furthermore, scheduling flexibility of gNB 170 may be enhanced by having more degrees of freedom in performing scheduling decisions and utilizing resources more effectively with respect to beam group feedback. Therefore, UE 110 based beam grouping may be implemented to enable flexible and efficient dynamic point switching and non-coherent multi-point transmissions in New Radio (NR) systems. Moreover, based on the enhanced scheduling flexibility with beam grouping, NR systems may provide significantly enhanced beam management robustness against, for example, beam blockage, UE rotation and movement, etc.

To enable efficient use of beam grouping from the perspective of overall NR system design, it is highly important to guarantee that signalling overheads related to beam grouping are minimized.

Figure 2:
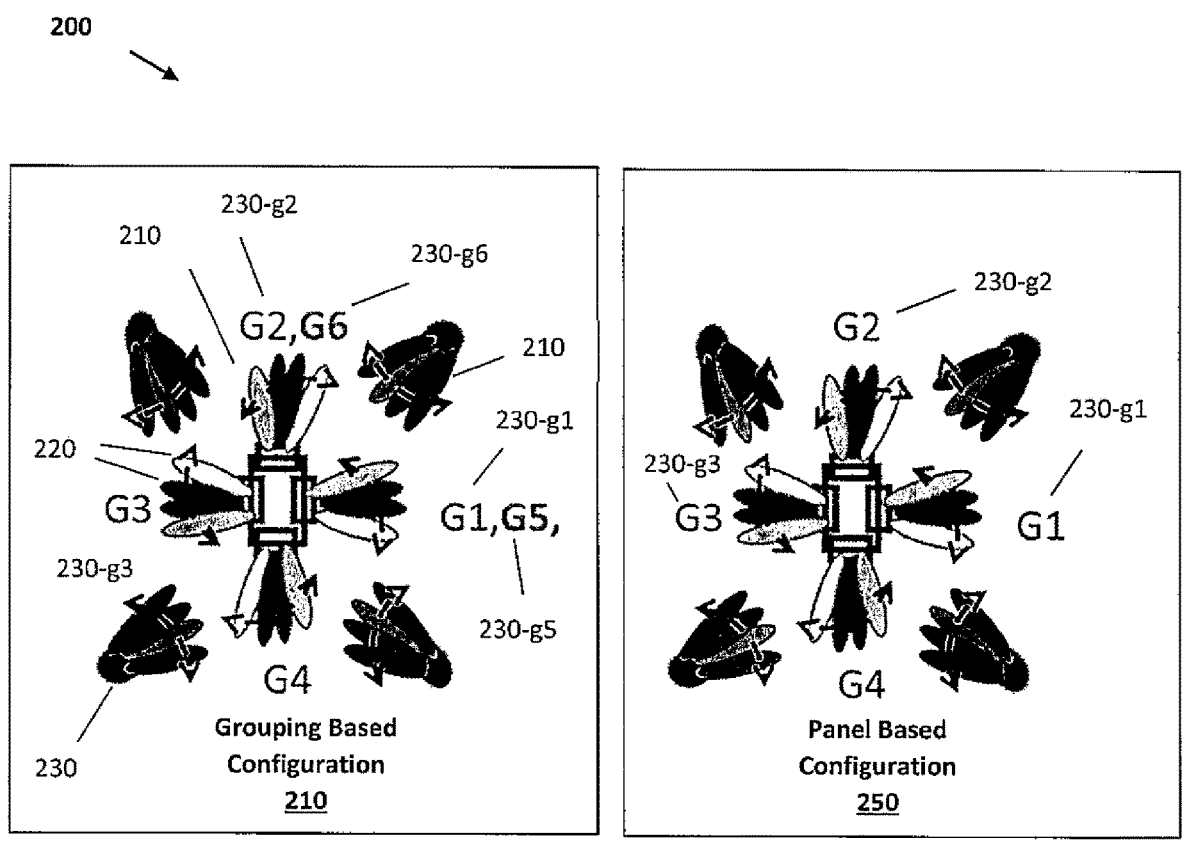
FIG. 2 shows an example of RX beam group and antenna panel group based reporting configurations.

Referring now to FIG. 2, an example 200 of RX Group and Panel based operations is shown.

FIG. 2 illustrates RX beam group 210 and an antenna panel group 250 based reporting configurations. In this example 200, G1, G2, etc., denotes different groups 230 (of beams) (shown as 230-g1, 230-g2, etc.) for RX beam group 210 and panel based grouping 250 reporting configurations. The major difference between these two alternatives (RX beam group 210 and antenna panel group 250) is the number of beam groups per UE RX antenna panel. For panel based grouping 250, the number of beam groups is limited to a single group (for example, one) whereas for RX beam grouping case the number of groups per panel may be larger than one.

Beam reporting in NR is addressed by agreements issued in relation to the 3GPP RAN1 #88 meeting. Agreements regarding beam reporting in NR (see, RAN1-88-chairman-notes) include a confirmation of a working assumption on group based beam reporting made in RAN1 Jan. NR Ad hoc Meeting. The agreements include an update that indicates further discussion (for further study, FFS) for possible down-selection or merging, (in particular, taking into account overhead).

NR supports the beam reporting considering L groups where $L>=1$ and each group refers to an Rx beam set (alternative 1, Alt1) or a UE antenna group (alternative 2, Alt2) depending on which alternative is adopted. For each group L, the UE 110 may report at least information indicating a particular group, measurement quantities for $N_l$ beam(s), and information indicating $N_l$ DL Tx beam(s), when applicable.

UE 110 may report information indicating a particular group, at least for some cases (or instances). Condition(s) to omit this parameter, for example, when $L=1$ or $N_1=1$, are designated as an area further study (FFS) from the 3GPP RAN1 #88 meeting.

UE 110 may report measurement quantities for $N_1$ beam(s). These measurement quantities may support L1 RSRP and CSI report (when CSI-RS is for CSI acquisition). The details of RSRP/CSI derivation and content are designated FFS. Other reporting contents, for example, RSRQ have also been designated FFS. Configurability between L1 RSRP and CSI report, and whether or not to support differential L1 RSRP feedback has been designated FFS. Further, how to select $N_1$ beam(s), for example, max $N_l$ beams in terms of received power being above a certain threshold or in terms of correlation less than a certain threshold, has been designated FFS.

UE 110 may report information indicating $N_1$DL Tx beam(s) when applicable. The details on this information, for example, CSI-RS resource IDs, antenna port index, a combination of antenna port index and a time index, sequence index, beam selection rules for assisting rank selection for MIMO tx, etc., have been designated FFS.

In some instances, group based beam reporting may be configurable per UE 110 basis. The group based beam reporting may be turned off per UE 110 basis, for example, when $L=1$ or $N_1=1$. No group identifier may be reported when the group identifier is turned off.

Areas that may be designated for further study include how L is to be determined, for example, by network configuration or UE selection or UE capability (for example, how many beams can be received simultaneously). Additionally, configuration using the CSI framework to support multi-panel or multi-TRP transmission is also designated FFS.

Example embodiments of the systems included herein provide example designs for diverse multi-level beam reporting schemes comprising of beam reporting modes and configurations. Particularly, example embodiments of multi-level beam reporting schemes disclosed herein may reduce the feedback signalling overhead for different beam/antenna panel group configurations.

In one example embodiment, multi-level based TX beam index reporting is defined for a beam group and/or antenna panel group. TX beam index may also be defined as configured RS resource, RS resource index, or RS antenna port where RS may be CSI-RS, DMRS of NR-PDCCH, NR_PDSCH or any RS enabling beam management functionality. The multi-level beam reporting may be configured to operate in full or differential or partial reporting mode. Differential and partial beam reports may have dependency to previous beam report, while a full report may be independent of previous report. The multi-level beam report may consist of one or more elements for each beam group/antenna panel. Multi-level based TX beam index reporting may include a full reporting mode configurations for a particular beam/antenna panel group, a full reporting mode configurations common for all beam/antenna panel groups, differential reporting modes, and partial reporting modes, etc.

According to an example, a full reporting mode configuration for a particular beam/antenna panel group may include a beam/antenna panel group ID for the i-th group. The full reporting mode configuration for the particular beam/antenna panel group may include maximum RSRP value of the i-th group in dB (or, alternatively, may use RSRP index from predefined table 'RSRP index to measurement quantity mapping, for example, 7 bit range for −140 dBm to −40 dBm. Alternatively, other measurement quantities may not be excluded, such as channel quality indicator (CQI), RSRQ, etc.

The full reporting mode configuration for a particular beam/antenna panel group may include relative power resolution window for the i-th group, $\Delta_i$ in dB, which may be defined as $(\max(\{RSRP\}_i) \min(\{RSRP\}))/(K_i-1)$, where operator defines a set of values for the i-th group, and where $K_i$ is the number of power levels determined as $K_i=2n$ and n-bit offset value. The value of $K_i$ may be configured group-specifically by a network. Alternatively, a network may also signal/pre-configure a relative power resolution window user-specifically. The reported RSRP values may be based on averaging of different measurement instants within a network configured measurement window. The full reporting mode configuration for the particular beam/antenna panel group may include relative n-bit relative power offset value defining differential power offset with respect to the maximum RSRP value of the i-th group. The full reporting mode configuration for the particular beam/antenna panel group may also include N-different TX beam indices for the i-th group.

According to an example, a full reporting mode configuration common for all beam/antenna panel groups. This may provide a common report for all beam/antenna panel groups. The full reporting mode configuration common for all beam/antenna panel groups may include a maximum RSRP value in dB associated over all configured beam/antenna panel groups.

The full reporting mode configuration common for all beam/antenna panel groups may further include the list of simultaneously usable beam groups or capability to simultaneously use reported beam groups, for example, 0=no 1=yes (depending on configuration defined by a network), and a relative power resolution window common for all groups, $\Delta$ in dB, which may be defined as $\Delta=(\max\{RSRP_j\})- \min(\{RSRP_j\}_1))/(K-1)$, where $\{RSRP_j\}_i$ is the j-th of element of the i-th set and the index j=1, . . . , N and i=1, . . . I, where N defines the number RSPR values in a set and I being the number of sets. Alternatively, a network may also signal/pre-configure relative power resolution window user-specifically for all groups.

The operators max and min operators may select the maximum and minimum values over all different sets. The parameter K may define a number of power levels determined as $K=2^n$ and n-bit offset value. The value of K may be configured by devices in a network 100. The reported RSRP values may be based on averaging of different measurement instants within network configured measurement window.

The full reporting mode configuration common for all beam/antenna panel groups may further include group-specific reporting. Group-specific reporting may include a beam/antenna panel group ID. Group-specific reporting may also include a relative n-bit relative power offset value defining differential power offset to the maximum RSRP value over all beam/antenna panel groups. Group-specific reporting may further include N-different TX beam indices for the i-th group.

According to an example, differential reporting modes may include a single-level non-group-wise differential beam report. The single-level non-group-wise differential beam report may be common for all beam groups and include a maximum RSRP value over beam groups (which may be measured in [dB]). For each beam group, the single-level non-group-wise differential beam report may include N different 1-bit relative power offset value for each antenna panel (AP) to indicate whether RSRP value is greater or equal to a configured power resolution window. In this instance, a network 100 may perform (or have performed) the mapping of TX beam indices to N positions.

The differential reporting modes may include multi-level non-group-wise differential beam report for N scheduled CSI-RS APs or N-previously reported TX beams. The multi-level non-group-wise differential beam report may be common for all beam groups and may include a maximum RSRP value over beam groups [dB] the list of simultaneously usable beam groups or capability to simultaneously use reported beam groups, for example 0=no 1=yes (depending on configuration defined by a network). The maximum RSRP value may only be reported if the measured maximum RSRP value differs Y dB from the previously reported maximum RSRP value. The set of maximum RSRP power difference values may be configured user-specifically via RRC signalling and indicated dynamically via downlink grant/uplink grant via DCI.

For each beam group, the multi-level non-group-wise differential beam report may include N TX beams n-bit relative power offset from the maximum RSRP value over beam groups. The network may configure the mapping of TX beam indices to N positions per beam group. Additionally, in some instances, source coding may be applied to further compress the signalled bits, for example, run-length, Lempel-Ziv, etc.

According to an example, partial reporting modes may include a multi-level partial beam report for N- previously reported TX beam indices enabling TX beam tracking capability of L<N new TX beams. The multi-level partial beam report for N- previously reported TX beam indices may be common for all beam groups and may include a maximum RSRP value over beam groups [dB]. The maximum RSRP value may only reported if the measured maximum RSRP value differs Y dB from the previously reported maximum RSRP value. Value Y may be different depending on whether the measured maximum RSRP value is higher or lower than the previously reported maximum, for example, if measured max RSRP is higher the Y may have higher value and if lower the Y value may be lower. The set of maximum RSRP power difference values may be configured user-specifically via RRC signalling and indicated dynamically via downlink grant/uplink grant via DCI.

Common to all beam groups for multi-level partial beam report for N- previously reported TX beam indices with tracking TX beam tracking capability of L<N new TX beams, the relative power resolution value may only be reported if the computed power resolution value differs X dB from previously reported relative power resolution value. The set of power resolution window difference values may be configured user-specifically via RRC signalling and indicated dynamically via downlink grant/uplink grant via DCI.

Multi-level partial beam report for N- previously reported TX beam indices may enable the TX beam tracking capability of L<N new TX beams. The partial beam report may include, for each beam group, information for N TX beams n-bit relative power offset from the maximum RSRP value over beam groups (network 100 may perform the mapping of TX beam indices to N positions). In some instances, source coding may be applied to further compress the signalled bits, for example, run-length, Lempel-Ziv, etc. Multi-level partial beam report for N- previously reported TX beam indices with tracking TX beam tracking capability of L<N new TX beams may include, for each beam group, L m-bit new TX beam positions ($2^n$ bit combination available where code word with m zeros is reserved to indicate no new beam in a group). In some instances, source coding may be applied to further compress the signalled bits, for example, run-length, Lempel-Ziv, etc. Additionally, the multi-level partial beam report may include L new TX beam indices not being part of previous beam report, where L<N.

Multi-level partial beam report for N- previously reported TX beam indices with TX beam tracking capability of L<N new strongest TX beams may include common information for all beam groups. This may include a maximum RSRP value over beam groups [dB]. The maximum RSRP value may only be reported if the measured maximum RSRP value differs Y dB from the previously reported maximum RSRP value. The set of maximum RSRP power difference values may be configured user-specifically via RRC signalling and indicated dynamically via downlink grant/uplink grant via DCI. The relative power resolution value may only be reported if the computed power resolution value differs X dB from previously reported relative power resolution value. The set of power resolution window difference values may be configured user-specifically via RRC signalling and indicated dynamically via downlink grant/uplink grant via DCI.

Multi-level partial beam report for N- previously reported TX beam indices with TX beam tracking capability of L<N new strongest TX beams may include information for each beam group. The information may include L new strongest TX beams in terms of RSRP not being part of previous beam report, where L<N.

According to an example embodiment, single-level based antenna port reporting is defined for a beam group and/or antenna panel group. This reporting may include a maximum RSRP value over beam groups [dB]. For each beam group, the single-level based antenna port reporting may include a 1-bit value for each AP to indicate whether RSRP value is greater or equal to configured relative power offset from the maximum. Alternatively, for each beam group, single-level based antenna port reporting may include a single bit indication if RSRP value is above preconfigured/signalled absolute threshold. Single-level based antenna port reporting may include AP indices.

According to an example embodiment, a network 100 (or device in network 100) may configure beam/antenna panel beam reporting to be as a combination of full, differential and partial beam reports.

In an example embodiment, a network 100 may pre-configure differential RSRP beam reporting for two different reporting modes, for example, reference signal, such as CSI-RS, antenna port and TX beam index based operations. The pre-configuration may be done user-specifically via RRC signalling a beam group-wise or using same configuration for all beam groups.

The pre-configuration may encapsulate one or more of the following parameters:
  Set of different power resolution levels, for example, $\{K_1, K_2, \ldots K_p,\}$ where $K_P$ defines the P-th number of power resolution levels; and
  Set of relative power resolution window values, where each value defines the power difference from the maximum RSRP value.

In an example embodiment, a PUCCH (also for PUSCH and MAC CE) based beam report may be defined as a bit map, which may be used to represent the previously reported APs/beam indices or the configured APs for beam measurements. In bit map based reporting specific beam IDs/APs are associated to specific bit positions in the map. For example, UE 110 may report N=4 beams thus the bitmap may have length 4 bits, each bit position corresponding to a beam ID/AP. This may be a partial or differential beam report based on the full report. In a differential beam report, only relative power offset RSRP values may be reported. In a partial report, not existing TX beam indices may be reported associated with relative power offset values. In bit map based reporting UE may have previously reported MAX RSRP and beam/AP indices and may then be configured to report by single bit ('1' above/equal or '0' below) indication whether a beam RSRP value is above the configured relative threshold value (relative to reported MAX RSRP). Alternatively a bit map may be used to report all beams/APs above an absolute threshold. UE 110 may update the corresponding beam IDs/APs in the bitmap by sending a full report. Alternatively, network may configure UE 110 to measure set of APs that UE 110 refers with a bit map. Signalling may be applied to a beam group or multiple beam groups or over all beam groups.

In an example embodiment, a PUSCH/MAC based beam report may be defined as a full report or alternatively, a partial report. The partial report may refer to the full AP index/beam index by bitmap/listing order of the beam/port IDs.

Figure 3:
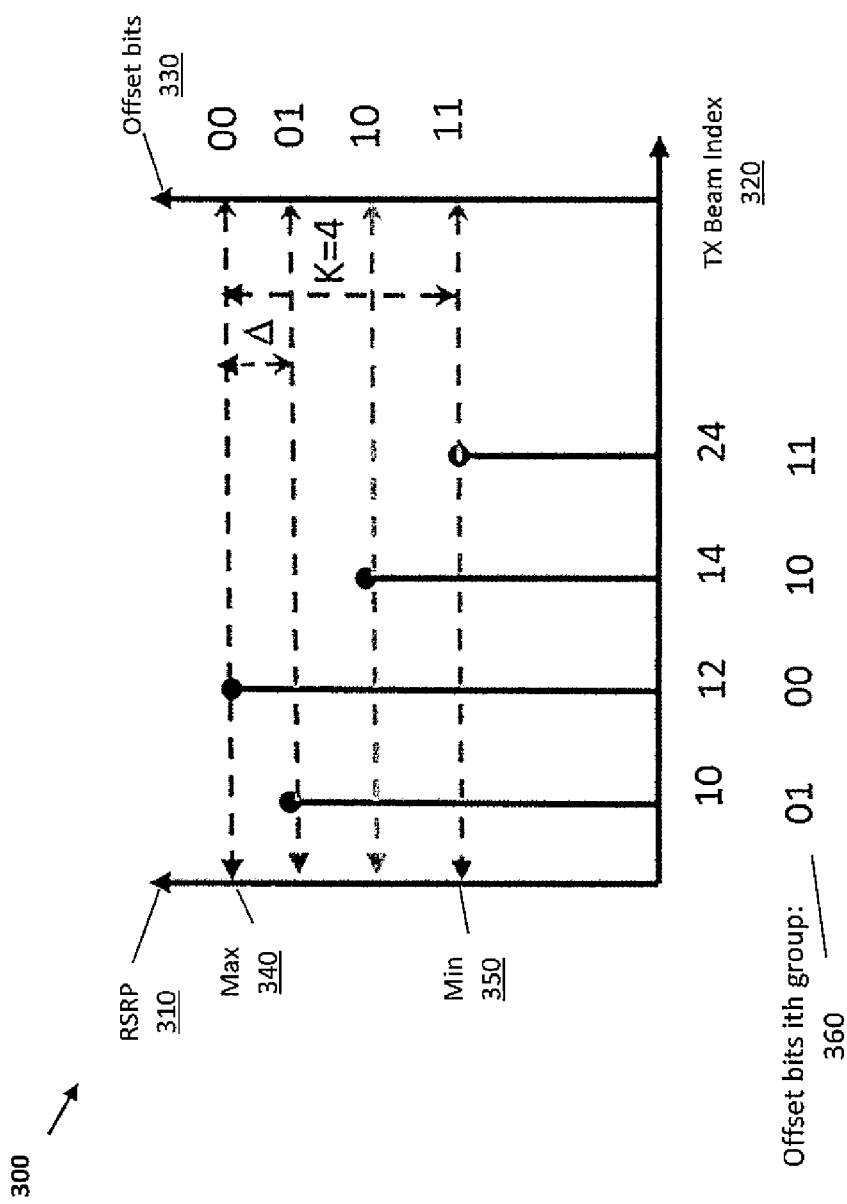
FIG. 3 shows an illustration of full group-wise multi-level based beam report computation for the i-th beam group.

Referring now to FIG. 3, an example of full group-wise multi-level based beam report computation for TX beam index reporting is shown.

FIG. 3 illustrates an example of full group-wise multi-level based beam report computation for the i-th beam group in which values for RSRP 310, TX beam index 320 and Offset bits 330 are presented in graphical form including offset bits for ith groups 360.

In this instance, a network 100 may have configured UE 110 to perform RSRP measurements and reporting for N-best TX beam indices per beam group associated with RSRP values. For full group-wise reporting common for all beam/antenna panel groups include the list of simultaneously usable beam groups or capability to simultaneously use reported beam groups, for example, 0=no 1=yes (depending on configuration defined by a network 100). For the full group-wise multi-level based beam report computation, both maximum 340 and minimum 350 RSRP values of a beam group i with the number of power resolution levels $K=2^n$ may be used to compute uniform power resolution window for a reported differential RSRP values, where n is the number of bits for power levels. More specifically, K−1 different power resolution windows may be computed between maximum and minimum RSRP values where each power resolution window may be calculated as: $\Delta_i=(\max_j(\{RSRP\}_i)-\min_j(\{RSRP\}_i))/(K-1)$, where operator $\{\ \}$ defines a set of different relative power resolution levels may be pre-configured user specifically via RRC signalling and an intended specific value of K can be dynamically indicated via downlink or uplink grant via DCI. Alternatively, a network 100 may also preconfigure absolute power resolution levels without imposing UE 100 to compute them the absolute power resolution levels dynamically. Each of RSRP values may be rounded to the closest power level and corresponding quantized RSRP relative power offset bit-level information may be generated. Accordingly, as a result of the rounding of the power level and generation of the corresponding quantized RSRP relative power offset bit-level, only offset values from the maximum power level may be reported for each TX beam index. The beam report may be transmitted via physical user-specific uplink control channel, for example, PUCCH, or as a part of PUSCH/MAC CE.

The required feedback may be summarised in a first alternative (Alt #1) as: Group-wise beam/antenna panel group report for TX beam. Beam reporting may consist of common for all beam/antenna panel groups the list of simultaneously usable beam groups or capability to simultaneously use reported beam groups, for example, 0=no 1=yes (depending on configuration defined by a network 100), and particular values for each group, such as a Beam group ID, a maximum RSRP [dB], and a relative power resolution window, $\Delta_i$, [dB]. Beam reporting may also consist of n-bit power offset. Additionally, source coding may be applied to further compress the signalled bits, for example, run-length, Lempel-Ziv, etc. Beam reporting may also consist of TX beam indices represented with Q-bits.

By using reported beam group feedback, beam group-specific quantized RSRP values can be reconstructed at gNB 170 as follows. The maximum RSRP value may be used as a reference value for the computation of rest of RSRP values. For each reported TX beam index, a corresponding quantized RSRP value may be obtained by subtracting the product of offset bits (in 10-base system) and power resolution window from the maximum RSRP value.

Figure 4:
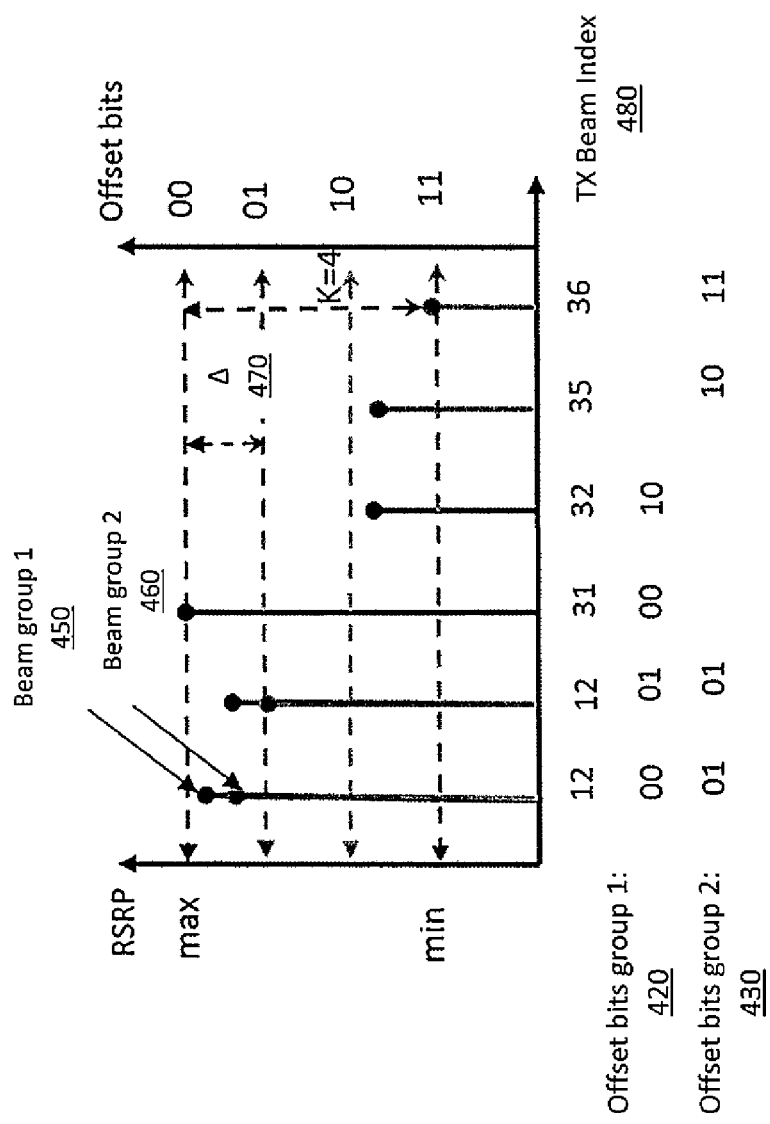
FIG. 4 shows an illustration of full non-group-wise multi-level based beam report computation for TX beam index reporting.

Referring to FIG. 4 an example 400 of full non-group-wise multi-level based beam report computation for TX beam index reporting is shown. In particular, an example of full non-group-wise multi-level based beam report for two beam groups, beam group 1 (450) (with values denoted by a solid line) and beam group 2 (460) (with values denoted by a dashed line) showing an RSRP 310 in relation to a position 410 for the beam groups.

In comparison of to the Alt-1 scheme discussed above with respect to FIG. 3, the maximum RSRP 340 and minimum RSRP 350 values over all beam groups may be used for a computation power resolution window. As a result of this, the feedback of a power resolution window may be omitted for each group as well as enabling the reported RSRP values over different beam groups to be comparable in terms of power and granularity. The required parameters of beam reporting may be as summarized as discussed with respect to alternative 2 (Alt #2).

Alt #2 may include non-group-wise beam/antenna panel group report for TX beam indices. Beam reporting, common for all groups, may consist of the list of simultaneously usable beam groups or capability to simultaneously use reported beam groups, for example, 0=no 1=yes (depending on configuration defined by a network 100), maximum RSRP value over beam groups [dB] and relative power resolution window, A (470), fixed over different beam groups [dB]. For each beam/antenna panel group, beam reporting may consist of a beam group ID. Beam reporting may also consist of N TX beams n-bit relative power offset from the maximum RSRP value over beam groups. Some source coding may be applied to further compress the signalled bits, for example, run-length, Lempel-Ziv, etc. Beam reporting may also consist of N-TX beam indices represented with Q-bits.

To reduce signalling overheads related to the CSI-RS antenna port (AP) as well as TX beam index based reporting modes, the network 100 may define different differential reporting modes. In basic differential reporting mode, scheduled CSI-RS APs or previously reported TX beam indices may be tracked by identifying whether these elements are within a certain power window from the maximum RSRP value or not.

Figure 5:
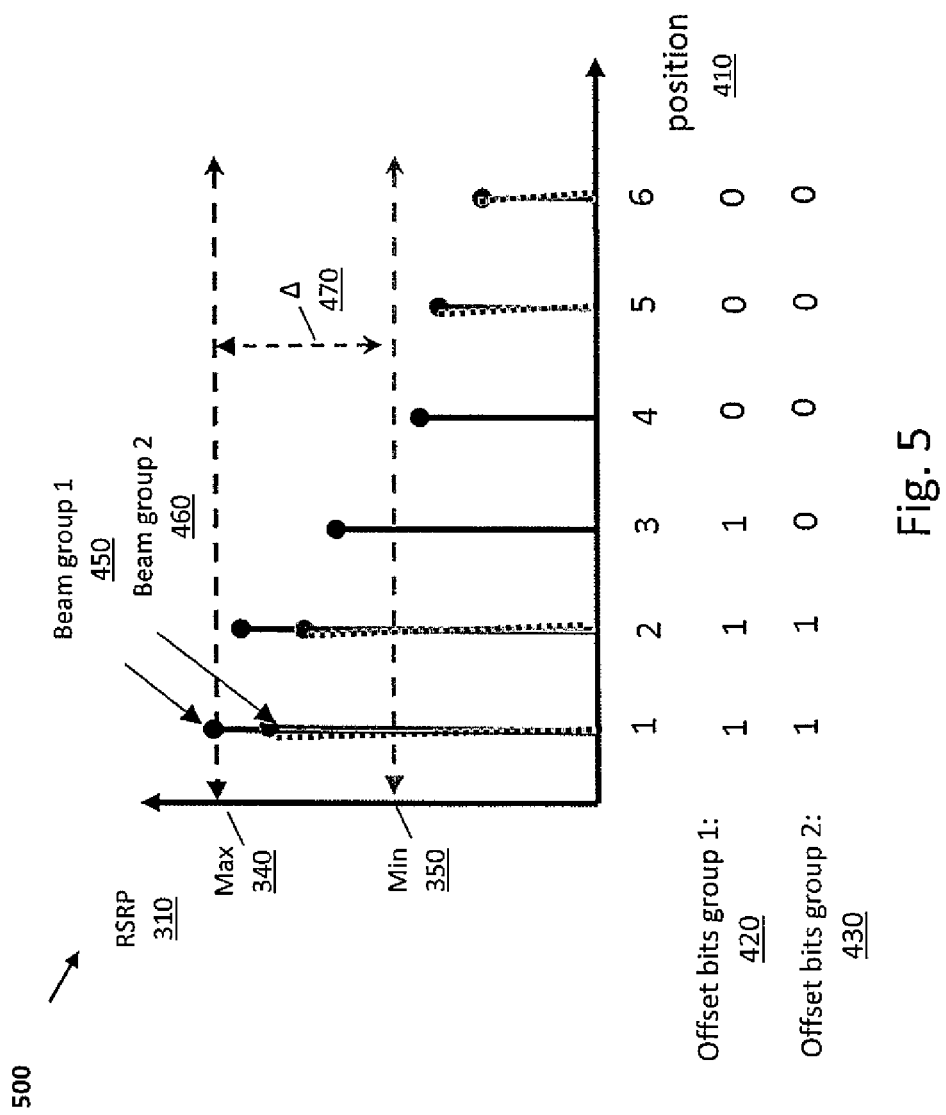
FIG. 5 shows an illustration of non-group-wise single-level differential based beam report for scheduled CSI-RS APs.

Referring to FIG. 5 an example 500 of non-group-wise single-level differential based beam report for scheduled CST-RS APs is shown. An example of single-level based differential report for two beam groups, beam group 1 (450) (with values denoted by a solid line) and beam group 2 (460) (with values denoted by a dashed line), with AP or TX beam index based reporting is illustrated.

In instances of TX beam index reporting, AP indices may be replaced by the positions 410 (shown as 1 to 6) of previously reported TX beam indices. Additionally, assumed device in network 100 may assume that TX beam indices are the same with respect to previously reported TX beam indices. According to an example of TX beam index reporting, the device may assume that position 1 is mapped at network side to TX beam index x and position 2 to TX beam index y, etc. The network 100 may configure via RRC signalling to UE 110 a set of different relative power resolution window values from which the desired value is dynamically selected via downlink grant/uplink with DCI. The maximum RSRP value over beam groups may be selected as a reference value from a single-level power threshold is formed by subtracting from the maximum RSRP value the selected power resolution window value. By using single-level power threshold, relative power offset bit values may be computed by comparing RSRP value to the threshold. If the measured RSRP value is larger or equal to the threshold value, a group-specific offset bit may be defined as one. Otherwise, the group-specific offset bit is equal to zero.

Alternative 3 (Alt #3) includes a single-level non-group-wise differential beam report for N scheduled CSI-RS APs or N-previously reported TX beams. The single-level differential beam reporting, common for all beam groups, may consist of a maximum RSRP value over beam groups [dB]. The single-level differential beam reporting, for each beam group, may consist of N different 1-bit relative power offset value for each AP to indicate whether RSRP value is greater or equal to a configured power resolution window. Network 100 may have performed the mapping of TX beam indices to N positions.

Figure 6:
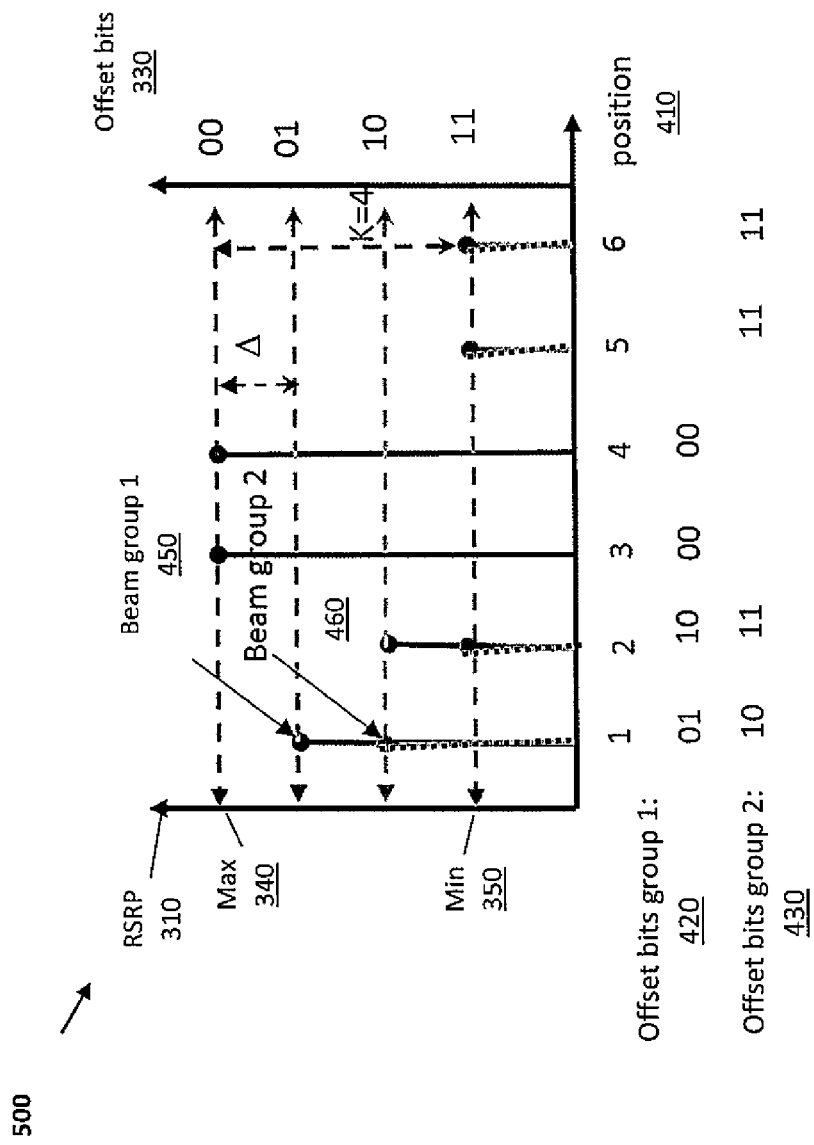
FIG. 6 shows an illustration of multi-level based differential beam report for all groups.

Referring to FIG. 6 an example 600 of multi-level based differential beam report for all groups is shown. FIG. 6 illustrates multi-level-level based differential beam report that may be transmitted by a UE 110 for a beam or antenna panel group.

Similar to Alt #3 discussed above with respect to FIG. 5, the devices in the network 100 may assume that the instance of TX beam index reporting AP indices may be replaced by the positions of previously reported TX beam indices. Additionally, the devices in the network 100 may assume that TX beam indices are the same with respect to previously reported TX beam indices. With regard to instances of TX beam index reporting, the devices in the network 100 may assume that the position 1 is mapped at network side to TX beam index x and the position 2 to TX beam index y, etc. Furthermore, the devices in the network 100 may assume that the relative power resolution window value may also be configured by a network 100 based on previous beam reports. In this instance, relative power resolution window values are not required (or needed) to be reported. In comparison to Alt #3, the multi-level may enable the network devices to track RSRP value changes over configured reporting elements.

Alternative 4 (Alt #4) may include multi-level non-groupwise differential beam report for N scheduled CSI-RS APs or with respect to N- previously reported TX beam indices. Multi-level differential beam reporting, common for all beam groups, may consist of the list of simultaneously usable beam groups or capability to simultaneously use reported beam groups, for example, 0=no 1=yes (depending on configuration defined by a network 100) and maximum RSRP value over beam groups [dB].

Multi-level differential beam reporting, for each beam group, may consist of N TX beams n-bit relative power offset from the maximum RSRP value over beam groups. Network 100 may have performed the mapping of TX beam indices to N positions. Some source coding may be applied to further compress the signalled bits related to TX beam indices and power offset values, for example, run-length, Lempel-Ziv, etc.

Figure 7:
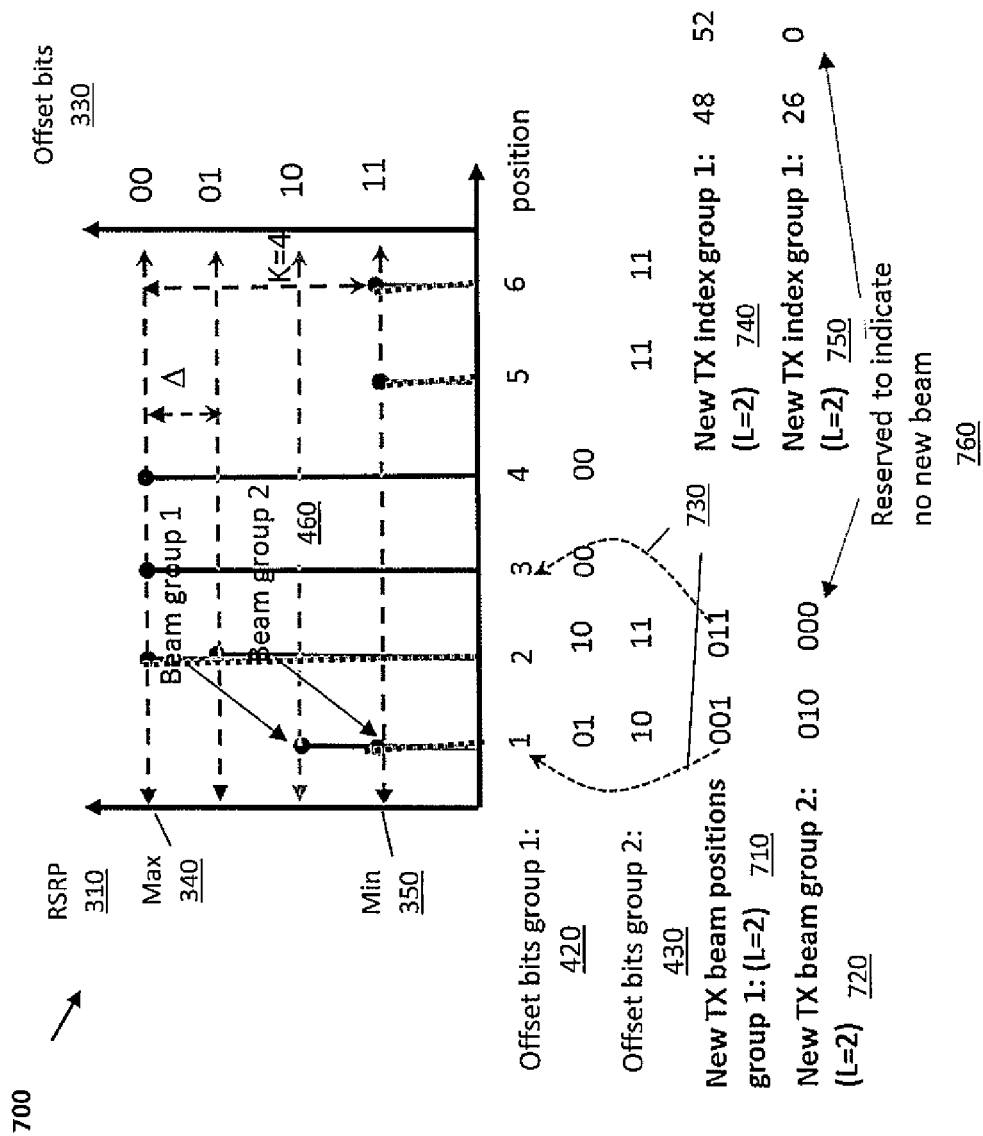
FIG. 7 shows an illustration of multi-level beam report for N- previously reported TX beam indices allowing to track L<N new TX beam indices per group.

Referring to FIG. 7 an example 700 of multi-level beam report for N- previously reported TX beam indices allowing to track L<N new TX beam indices per group is shown. FIG. 7 illustrates an example of multi-level based partial beam report with capability to track L new TX beams (shown as L=2, 710 and 720) for each two beam groups.

This beam reporting format may be targeted to enable the tracking of L-new strongest TX beams that were not as part of previously reported TX beams.

Alternative 5 (Alt #5) may provide a multi-level partial beam report for N- previously reported TX beam indices with tracking TX beam tracking capability of L<N new TX beams. Multi-level partial beam reporting, common for all beam groups, may consist of maximum RSRP value over beam groups [dB].

Multi-level partial beam reporting, for each beam group, may consist of N TX beams n-bit relative power offset from the maximum RSRP value over beam groups (network 100 may have performed the mapping 730 of TX beam indices to N positions). Some source coding may be applied to further compress the signalled bits, for example, run-length, Lempel-Ziv, etc. Multi-level partial beam reporting, for each beam group, may further consist of L m-bit new TX beam positions 740, 750 (for example, $2^m$ bit combination available where code-word with m zeros is reserved to indicate no new beam in a group). Some source coding may be applied to further compress the signalled bits, for example, run-length, Lempel-Ziv, etc. Multi-level differential beam reporting, for each beam group, may also consist of L new TX beam indices not being part of previous beam report, where L<N.

Figure 8:
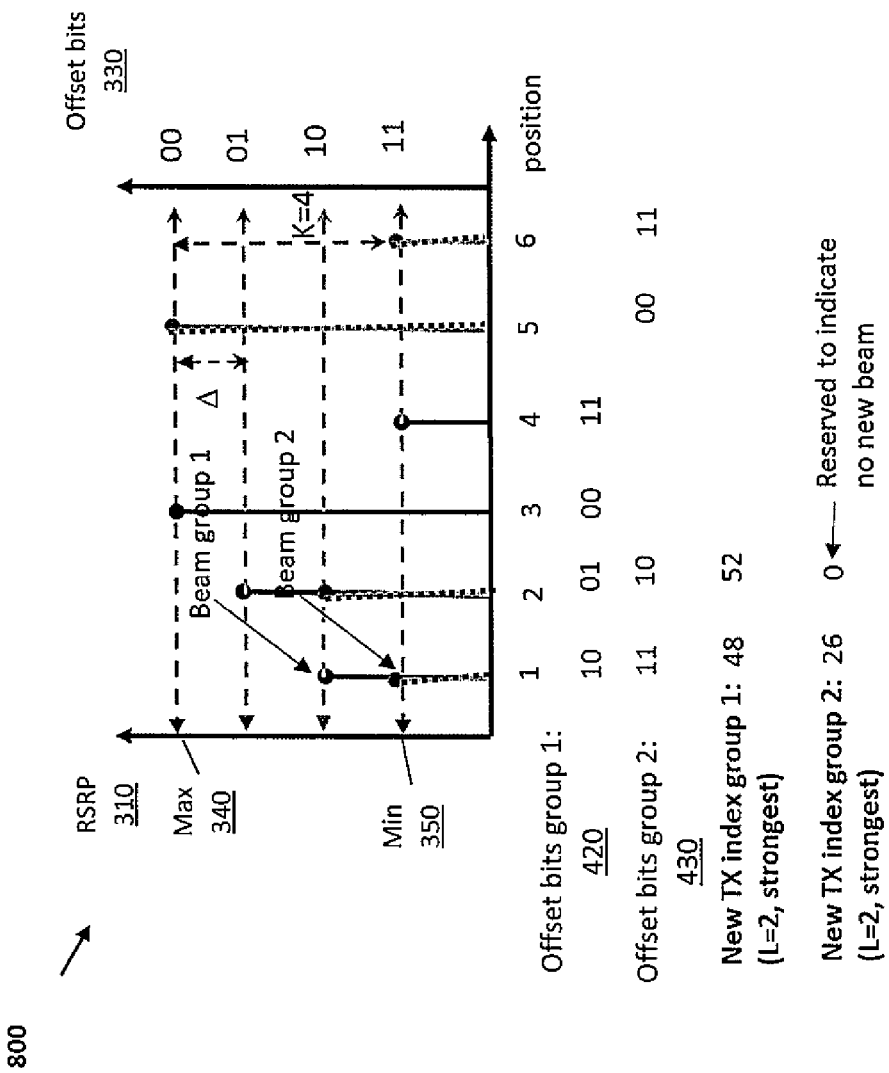
FIG. 8 shows an illustration of multi-level beam report for N- previously reported TX beam indices allowing to track L<N new strongest TX beam indices per group.

Referring to FIG. 8, an example of multi-level beam report for N- previously reported TX beam indices allowing to track L<N new strongest TX beam indices per group is shown. Network 100 may use multi-level based partial beam report with a capability to track L new strongest TX beams for each of the multiple (for example, two) beam groups. For example, for two groups, 2 L strongest beams may be tracked.

The beam reporting format may be targeted to enable the tracking of L-new strongest TX beams that were not included as part of previously reported TX beams. With regard to Alt #6 (which is further discussed herein below), multi-level beam report may not be required to contain position information because only L new strongest TX beams may be reported resulting in further reduced signalling overhead. gNB 170 may associate reported new TX beams to reported beam positions based on user of reported relative power offset value information.

Alternative 6 (Alt #6) provides a multi-level partial beam report for N- previously reported TX beam indices with tracking TX beam tracking capability of L<N new strongest TX beams. Multi-level partial beam reporting, common for all beam groups, may consist of a maximum RSRP value(s) over beam groups [dB]. Multi-level partial beam reporting, for each beam group, may consist of N TX beams n-bit relative power offset from the maximum RSRP value over beam groups (network 100 may have performed the mapping 730 of TX beam indices to N positions). Some source coding may be applied to further compress the signalled bits, for example, run-length, Lempel-Ziv, etc. Multi-level differential beam reporting, for each beam group, may further consist of L new strongest TX beams in terms of RSRP not being part of previous beam report, where L<N.

Figure 9:
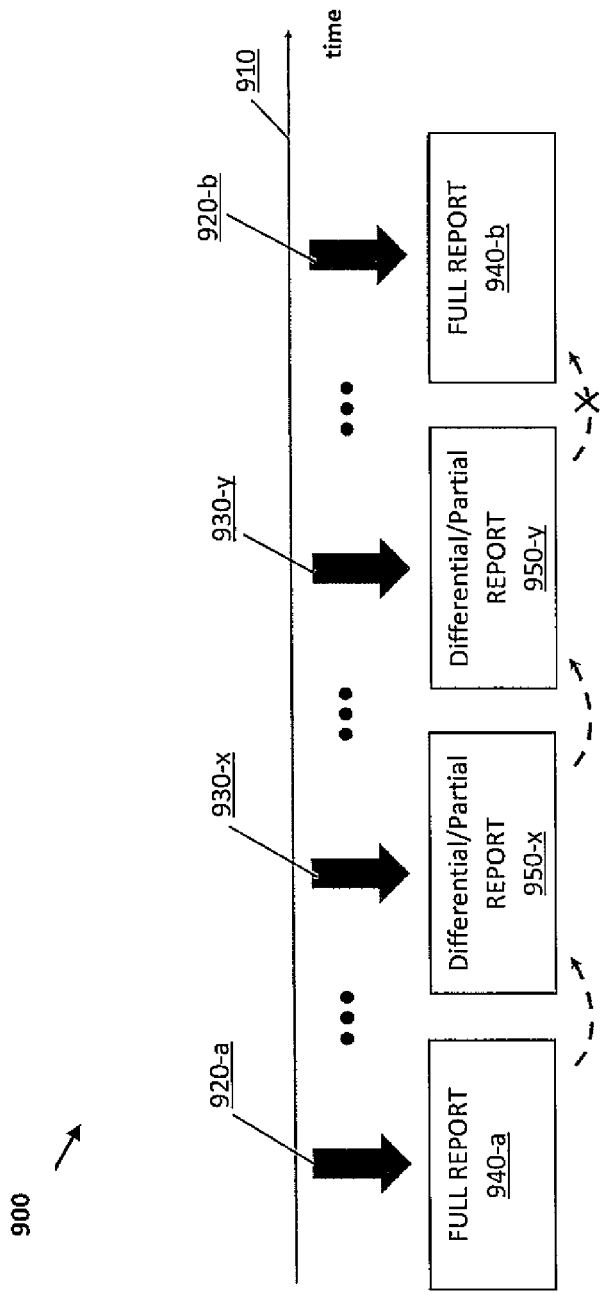
FIG. 9 shows an illustration of the utilization of different beam reporting modes.

Referring to FIG. 9, an illustration 900 of the utilization of different beam reporting modes is shown.

Different reporting modes and required resources may be pre-configured user-specifically via RRC signalling. For example, a full report 910 (shown, by way of illustration, as 940-a and 940-b) and a differential/partial report 950 (shown, by way of illustration, as 950-x and 950-y) may be pre-configured for the UE 110. Then, the used reporting mode and corresponding resources may be indicated dynamically for a UE 110 via downlink/uplink grant via DCI. For example, as shown along a time axis 910, at time 920-a, a full report 910-a may be indicated. The full report 920 may be a complete full report with no dependency to previous reports (for example, as shown at report 940-b, indicated at time 920-b). At a time 930-x, a differential/partial report 950-x may be indicated. The differential/partial report 950 may use a same power resolution window setting as with full report over different differential reports. The differential/partial report 950 may report only TX beam indices if their RSRP values have changed from their previous level to another level or if new TX beam index arrives to the set of N best beams. The differential/partial report 950 may enable low signalling overhead TX beam tracking.

Each of the reports may be configured to be periodic/semi-persistent or aperiodic. The beam reporting may be done by either using MAC CE or via physical uplink control channel. The network 100 may mainly use MAC CE for the full scale beams reports based on the ability to carry larger payload size with MAC CE signalling. The network 100 may then update full scale beam reports 940 with differential or partial beam reports 950. Network 100 may leverage a combination of differential and partial reporting modes to significantly reduce feedback signalling overhead with respect to full beam reporting mode.

Referring to FIG. 10 an example method 1000 for multi-level based differential beam reporting is shown.

At block 1010, the method may include configuring (or providing configuration information to UE 110 for) multi-level based TX beam index reporting for a beam group 210 and/or antenna panel group 250 (such as described above with respect to FIG. 2). The multi-level beam reporting may be configured to operate in full or differential reporting mode. The multi-level beam report may consist of one or more elements for each beam group/antenna panel, such as described above with respect to FIGS. 2 to 8.

At block 1020, the method may include selecting a reporting mode configuration from multiple reporting modes for the multi-level based differential beam reporting. For example, the UE 110 may select a reporting mode from a full reporting mode configuration for a beam/antenna panel group 210/250 specifically, a full reporting mode configuration common for all beam/antenna panel groups, a differential reporting mode, or a partial reporting mode.

At block 1030, the method may include the UE 110 receiving an indication and transmitting a report to gNB 170 based on a configured mode determined (or a reporting mode selected) from block 1020.

Without in any way limiting the scope, interpretation, or application of the claims appearing below, a technical effect of one or more of the example embodiments disclosed herein may facilitate reduced signaling overhead related to beam/antenna panel group reporting. Another technical effect of one or more of the example embodiments disclosed herein enables a network to flexibly configure different user-specific beam reports according to network needs and scenario, for example, a combination of full and differential reports. Another technical effect of one or more of the example embodiments disclosed herein enables potentially low latency reporting as smaller amount of resources may be needed to report.

An example embodiment may provide a method that comprises configuring multiple reporting modes for multi- and/or single-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, selecting a reporting mode from the multiple reporting modes, and sending a report based on the selected reporting mode.

An example embodiment may be provided in an apparatus comprising at least one processor; and at least one non-transitory memory including computer program code, the at least one memory and the computer program code may be configured to, with the at least one processor, cause the apparatus to: configure multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, select a reporting mode from the multiple reporting modes, and send a report based on the selected reporting mode.

An example embodiment may be provided non-transitory computer program product comprising a computer-readable medium bearing computer program code embodied therein for use with a computer, the computer program code comprising code for configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, selecting a reporting mode from the multiple reporting modes, and sending a report based on the selected reporting mode.

In accordance with another example, an example apparatus comprises: means for configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode, means for selecting a reporting mode from the multiple reporting modes, and means for sending a report based on the selected reporting mode.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are example embodiments provided to enable persons skilled in the art to make or use the invention and not to limit the scope of the invention which is defined by the claims.

The foregoing description has provided by way of non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode;
selecting a reporting mode from the multiple reporting modes; and
sending a report based on the selected reporting mode.

2. The method of claim 1, wherein the full reporting mode configuration for the particular beam/antenna panel group includes at least one of:
a beam/antenna panel group ID for an i-th group,
a maximum reference signal received power (RSRP) value of the i-th group in dB,
a relative power resolution window for the i-th group in dB,
a preconfigured relative power resolution window in dB,
a relative n-bit relative power offset value defining differential power offset with respect to the maximum RSRP value of the i-th group, and
N-different TX beam indices for the i-th group.

3. The method of claim 1, wherein the full reporting mode configuration common for the plurality of beam/antenna panel groups includes at least one of:
a common report for the plurality of beam/antenna panel groups; and
group-specific reporting.

4. The method of claim 3, wherein the common report for the plurality of beam/antenna panel groups further comprises at least one of:
a maximum reference signal received power (RSRP) value in dB associated over the plurality of beam/antenna panel groups, a list of simultaneously usable beam groups, a capability to simultaneously use reported beam groups, and a relative power resolution window common for the plurality of beam/antenna panel groups.

5. The method of claim 3, wherein the group-specific reporting further comprises at least one of:
a beam/antenna panel group ID, a relative n-bit relative power offset value defining differential power offset to a maximum reference signal received power (RSRP) value over the plurality of beam/antenna panel groups, and N-different TX beam indices for the i-th group.

6. The method of claim 1, wherein the differential reporting mode includes at least one of a single-level non-group-wise differential beam report and a multi-level non-group-wise differential beam report for N scheduled Channel State Information Reference Signal (CSI-RS) antenna ports (AP) or N-previously reported transmitted beams per group.

7. The method of claim 6, wherein the single-level non-group-wise differential beam report further comprises at least one of:
a maximum RSRP value over the plurality of beam/antenna panel groups; and
N different 1-bit relative power offset value for each beam/antenna panel group.

8. The method of claim 6, wherein the multi-level non-group-wise differential beam report for N scheduled CSI-RS APs or N-previously reported TX, for all beam groups, further comprises at least one of:
a maximum reference signal received power (RSRP) value over the plurality of beam/antenna panel groups; and
a relative power resolution value, only if a computed power resolution value differs X dB from a previously reported relative power resolution value.

9. The method of claim 6, wherein the multi-level non-group-wise differential beam report for N scheduled CSI-RS APs or N- previously reported TX, for the plurality of beam/antenna panel groups, further comprises, for N TX beams, n-bit relative power offset from the maximum RSRP value over the plurality of beam/antenna panel groups.

10. The method of claim 1, wherein the partial reporting mode includes at least one of multi-level partial beam report for N- previously reported TX beam indices with tracking TX beam tracking capability of L<N new TX beams, and multi-level partial beam report for N- previously reported TX beam indices with TX beam tracking capability of L<N new strongest TX beams.

11. The method of claim 10, wherein the multi-level partial beam report for N- previously reported TX beam indices with TX beam tracking capability of L<N new TX beams further comprises at least one of:
a maximum RSRP value over the plurality of beam/antenna panel groups;
relative power resolution value is only reported if the computed power resolution value differs X dB from previously reported relative power resolution value.

12. The method of claim 11, wherein TX beam index comprises at least one of a configured reference signal (RS) resource, a RS resource index, and a RS antenna port, wherein RS comprises at least one of Channel State Information Reference Signal (CSI-RS), Demodulation Reference Signal (DMRS) of New Radio Physical downlink Control Channel (NR-PDCCH), NR_Physical Downlink Shared Channel (PDSCH) and a RS enabling beam management functionality.

13. An apparatus, comprising:
at least one processor; and
at least one non-transitory memory including computer program code,
the at least one memory and the computer program code configured to, with the at least one processor, cause the apparatus to perform at least the following:
configure multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode;
select a reporting mode from the multiple reporting modes; and
send a report based on the selected reporting mode.

14. The apparatus of claim 13, wherein the full reporting mode configuration for the particular beam/antenna panel group includes at least one of:
a beam/antenna panel group ID for an i-th group,
a maximum reference signal received power (RSRP) value of the i-th group in dB,
a relative power resolution window for the i-th group in dB,
a pre-configured relative power resolution window in dB,
a relative n-bit relative power offset value defining differential power offset with respect to the maximum RSRP value of the i-th group, and
N-different TX beam indices for the i-th group.

15. The apparatus of claim 13, wherein the full reporting mode configuration common for the plurality of beam/antenna panel groups includes at least one of:
a common report for the plurality of beam/antenna panel groups; and
group-specific reporting.

16. The apparatus of claim 15, wherein the common report for the plurality of beam/antenna panel groups further comprises at least one of:
a maximum reference signal received power (RSRP) value in dB associated over the plurality of beam/antenna panel groups, and one of a relative power resolution window common for the plurality of beam/antenna panel groups, and a pre-configured relative power resolution window in dB.

17. The apparatus of claim 15, wherein the group-specific reporting further comprises at least one of:
a beam/antenna panel group ID, a relative n-bit relative power offset value defining differential power offset to a maximum reference signal received power (RSRP) value over the plurality of beam/antenna panel groups, and N-different TX beam indices for the i-th group.

18. The apparatus of claim 13, wherein the differential reporting mode includes at least one of a single-level non-group-wise differential beam report and a multi-level non-group-wise differential beam report for N scheduled Channel State Information Reference Signal (CSI-RS) antenna ports (APs) or N- previously reported transmitted beams.

19. The apparatus of claim 13, wherein the at least one memory and the computer program code are configured to, with the at least one processor, cause the apparatus to:
apply source coding to further compress signalled bits using at least one of run-length and Lempel-Ziv.

20. A non-transitory computer program product comprising a computer-readable medium bearing computer program code embodied therein for use with a computer, the computer program code comprising code for:
configuring multiple reporting modes for multi-level based transmitter (TX) beam index reporting for a particular beam/antenna panel group from a plurality of beam/antenna groups, wherein the multiple reporting modes includes at least one of a full reporting mode configuration for the particular beam/antenna panel group, a full reporting mode configuration common for the plurality of beam/antenna panel groups, a differential reporting mode, and a partial reporting mode;
selecting a reporting mode from the multiple reporting modes; and
sending a report based on the selected reporting mode.

* * * * *